US012742886B2

(12) United States Patent
Kossin et al.

(10) Patent No.: US 12,742,886 B2
(45) Date of Patent: Sep. 22, 2026

(54) SPATIAL SCANNING PNT

(71) Applicant: Canyon Consulting, LLC, Los Angeles, CA (US)

(72) Inventors: Philip S. Kossin, Passaic, NJ (US); James Lake, Torrence, CA (US); Laura Duffy, Lawndale, CA (US)

(73) Assignee: CANYON CONSULTING, LLC, El Segundo, CA (US)

( * ) Notice: Subject to any disclaimer, the term of this patent is extended or adjusted under 35 U.S.C. 154(b) by 278 days.

(21) Appl. No.: 18/623,833

(22) Filed: Apr. 1, 2024

(65) Prior Publication Data

US 2024/0329256 A1 Oct. 3, 2024

Related U.S. Application Data

(60) Provisional application No. 63/455,883, filed on Mar. 30, 2023.

(51) Int. Cl.
*G01S 19/02* (2010.01)
*G01S 19/39* (2010.01)
*G01S 19/49* (2010.01)

(52) U.S. Cl.
CPC ............ *G01S 19/02* (2013.01); *G01S 19/393* (2019.08); *G01S 19/49* (2013.01)

(58) Field of Classification Search
CPC ........ G01S 19/02; G01S 19/393; G01S 19/49; G01S 19/47
See application file for complete search history.

(56) References Cited

U.S. PATENT DOCUMENTS 9,054,414 B2 * 6/2015 Mizzoni ............... H01Q 19/192
9,360,323 B2 * 6/2016 Grokop ............... G01C 21/165
(Continued)

FOREIGN PATENT DOCUMENTS

EP 1245967 A1 10/2002
KR 1020180092791 A 8/2018
WO 2024207017 A1 10/2024

OTHER PUBLICATIONS

Elsallal, et al. "An additively manufactured, all-metallic frequency-scaled ultra-wide spectrum element (AM-FUSE) active electronically scanned array (AESA) for space-borne applications." In 2019 IEEE International Symposium on Phased Array System & Technology (PAST), pp. 1-6. IEEE, 2019. (Year: 2019).*
(Continued)

*Primary Examiner* — Vladimir Magloire
*Assistant Examiner* — Yonghong Li
(74) *Attorney, Agent, or Firm* — Kutak Rock LLP; Jason S. Jackson

(57) ABSTRACT

The present invention provides a global, cislunar, interplanetary, local navigation system that can provide position, navigation, and/or time (PNT) to users. Embodiments may use scanning active electronically steerable antennas (AESA) on multiple satellite (or other) sources that scan their beams over a volume of interest. This enables the use of high-gain antenna beams while at the same time spanning an operating volume with multiple users. Users and satellite sources can establish bilateral links and perform two-way time transfer (TWTT) to provide users with range and time correction. Bilateral links can provide authentication, registration of users, user-specific security keying, a means for allowance and/or denial of access, and enables a paid service. The scanning beam approach means each user can get a ranging/time update for only a fraction of the time.

20 Claims, 4 Drawing Sheets

(56) References Cited

U.S. PATENT DOCUMENTS

| | | | | |
|---|---|---|---|---|
| 9,602,580 | B2 * | 3/2017 | Sobhani | H04L 67/1097 |
| 10,566,683 | B1 * | 2/2020 | Campbell | H01Q 3/36 |
| 10,707,961 | B2 * | 7/2020 | Turner | H04B 7/195 |
| 11,272,003 | B2 * | 3/2022 | Lv | H04J 3/12 |
| 2009/0315764 | A1 | 12/2009 | Cohen et al. | |
| 2016/0011318 | A1 * | 1/2016 | Cohen | G01S 19/05 342/357.68 |
| 2018/0175920 | A1 * | 6/2018 | Parker | H01Q 3/26 |
| 2021/0194568 | A1 * | 6/2021 | Szczepanik | H04B 7/088 |
| 2021/0208286 | A1 * | 7/2021 | Turpin | G01S 3/38 |
| 2021/0311203 | A1 * | 10/2021 | Reis | G01S 19/00 |

OTHER PUBLICATIONS

"International Preliminary Report on Patentability Received for International PCT Application No. PCT/US2024/022541, mailed on Oct. 9, 2025."

"International Search Report and Written Opinion received for International PCT Application No. PCT/US2024/022541, Search completed on Jul. 22, 2024, mailed on Jul. 22, 2024."

* cited by examiner

SPATIAL SCANNING PNT

CROSS-REFERENCE TO RELATED APPLICATIONS

This application claims priority to U.S. Provisional Application Ser. No. 63/455,883, filed Mar. 30, 2023, the entire disclosure of which is incorporated herein by reference.

FIELD OF THE INVENTION

The present invention relates generally to systems for and methods of providing position, navigation, and/or time (PNT) to a user. More specifically, the present invention is capable of providing PNT to user on Earth, a particular part of Earth, the Moon ("cislunar"), other parts of space, or specific regions within a city, including a single building.

BACKGROUND

The forthcoming return of humans to the lunar environment presents significant challenges and rewards. Foremost in the myriad of challenges is navigation. While most of the world relies on Global Navigation Satellite Systems (GNSS) for the Earth environment, these systems are not suitable for Cislunar space.

The primary limitation in extending GNSS service from Earth to cislunar space can be defined by the Dilution of Precision (DoP), where resulting position and time accuracy can be estimated. Given that legacy GNSS systems operate with one-way signals, the user equipment must receive simultaneously from four spatially dispersed sources to accurately determine both time and position. The farther apart these sources are relative to the distance to the user, the lower the DoP (lower DoP=more accurate solution). When viewing the legacy GNSS constellations from the Moon, they fill only a very small portion of the "sky," resulting in a very large DoP and therefore poor navigational accuracy.

A reliable and accurate cislunar navigation system will require sufficiently dispersed signal sources to provide the needed accuracy for lunar operations, including landing and ascent operations. One of the primary challenges facing a cislunar navigational system is providing service over large distances while keeping SWaP-C within practical bounds. The average earth to moon distance is 384,400 km. This 20 times farther than the current GPS constellations, and the received signals will be much weaker. Furthermore, a thorough analysis of where to place the position, navigation and timing (PNT) signals within the cislunar environment is key to provide capability and affordability.

It would be advantageous to provide a system to overcome the foregoing deficiencies in navigation. It would be advantageous to provide such a system that, in addition to functioning in a cislunar environment, could also function as a global, interplanetary, and local navigation system.

SUMMARY

The present invention provides a global, cislunar, interplanetary, local navigation system that can provide position, navigation, and/or time (PNT) to users. Embodiments may use scanning active electronically steerable antennas (AESA) on multiple satellite (or other) sources that scan their beams over a volume of interest. This enables the use of high-gain antenna beams while at the same time spanning an operating volume with multiple users.

Users and satellite sources can establish bilateral links and perform two-way time transfer (TWTT) to provide users with range and time correction. Bilateral links can provide authentication, registration of users, user-specific security keying, a means for allowance and/or denial of access, and enables a paid service. The scanning beam approach means each user can get a ranging/time update for only a fraction of the time.

An on-board inertial navigation system (INS) allows users to maintain accurate PNT between range/time updates. Average scan rate is selected such that users receive a new update before the local INS drift grows beyond set threshold. The user antenna performs scan and search during acquisition, and may be aided by a trajectory log and/or source ephemeris.

Embodiments of the invention may be implemented as multiple clusters of small satellites, each responsible to scan a portion of the solid angle scanning cone. This increases reliability, robustness, reduces non-recurring engineering costs (NRE), reduces per-satellite direct-current (DC) power, and reduces launch costs. It also allows for incremental deployment and transparent onboarding of new capability as satellites are replaced over time.

Sources/satellites can perform TWTT over independent intersatellite/satellite to earth links to propagate earth-based master time to the system. This eliminates the need for exotic spaceborne atomic time frequency standards (AFS) currently used on GPS satellites. Sources/satellites may have oven quartz crystal oscillators (OCXO) or chip-scale atomic clocks (CSAC) clocks which have low drift between updates.

A key distinguishing feature in embodiments of the invention is the use of scanned AESAs on both sides of link to cover a volume of interest, and use of INS with a Kalman Filter to enable users to calculate PNT solutions using scanned, low duty-cycle signals.

Embodiments of the invention can provide coverage of vast cislunar space which is possible using modest or low size, weight and power and also cost (low SWaP-C) satellites.

Embodiments of the invention can use multiple small satellites to form the equivalent of a single source.

Embodiments of the invention can provide PNT coverage with much lower power levels than other Global Navigation Satellite Systems (GNSS), allowing distributed solution whereby multiple smallsats can emulate functions previously done by large expensive satellites.

Embodiments of the invention can provide two-way links for improved authentication and security.

Embodiments of the invention can use higher-gain AESA antennas on both sides of link to improve anti-jam (AJ) and Anti-Spoof (AS) performance.

These and other benefits will be apparent to a person of ordinary skill in the art on reading the present disclosure.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION OF THE DRAWINGS

Various embodiments of the invention are set forth in the following description and shown in the drawings and are particularly and distinctly pointed out and set forth in any appended claims.

DETAILED DESCRIPTION

Various embodiments of the present invention is disclosed herein; however, it is to be understood that the disclosed embodiments are merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The instant invention provides systems for and methods of providing PNT and low-data rate communication to users on Earth, a particular part of Earth, the Moon ("cislunar"), other parts of space, or specific geographic regions including cities, counties, states, blocks, regions, buildings, and/or dwellings.

In exemplary cislunar embodiments, the present invention generally includes low SWaP-C satellites in Earth orbit, Earth-Moon Lagrange points, and lunar orbit with two-way signals providing PNT and low-data rate communication. In some such embodiments, the invention integrates INS, AESA antennas, and multiple orbit satellite constellations.

Figure 1:
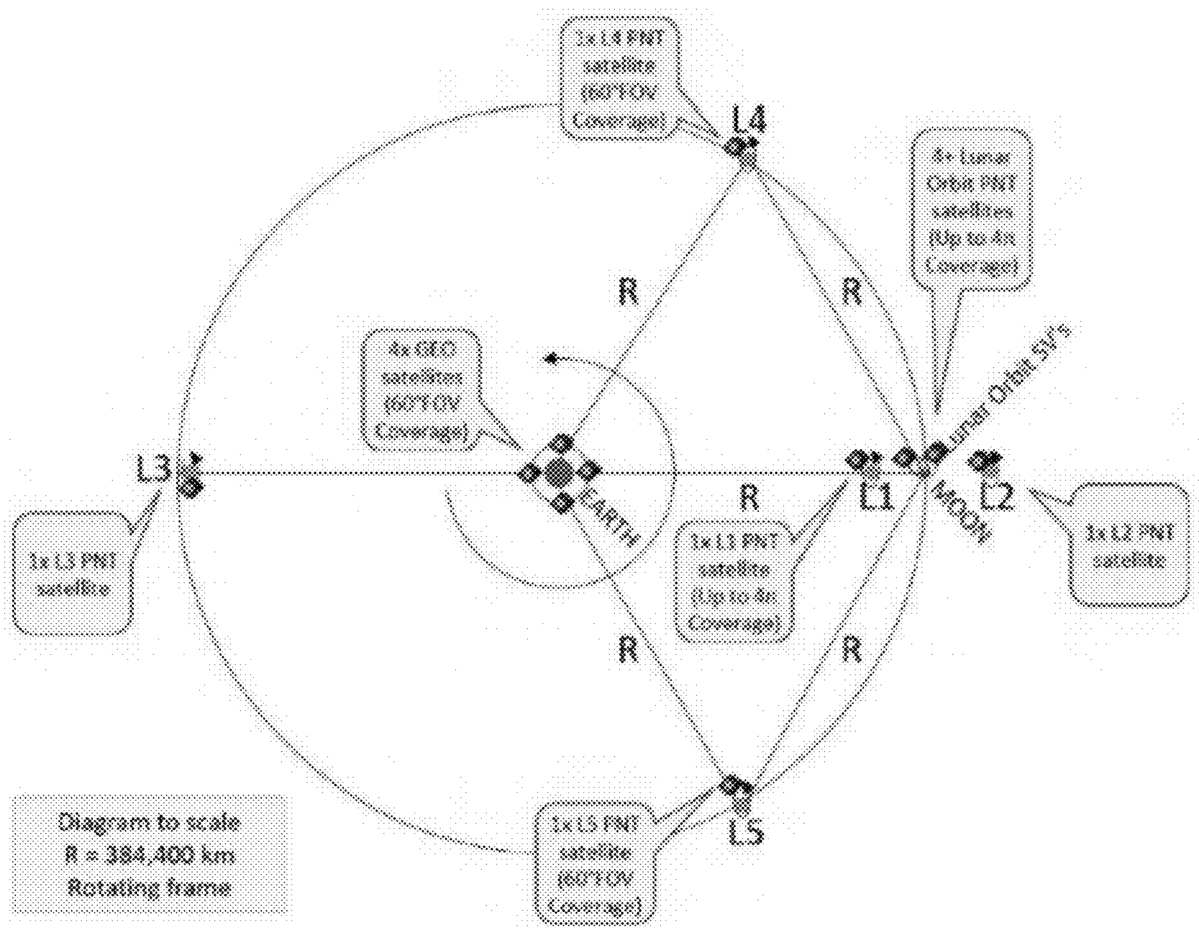
FIG. 1 shows a satellite layout according to some embodiments of the present invention.

As shown in FIG. 1, exemplary embodiments include four satellite vehicles (SV) located in Earth's geostationary orbit (GEO), one SV located at each of the Earth-Moon Lagrange points (i.e. L1, L2, L3, L4, L5), and four SVs located in lunar orbit. In some such embodiments, Scanning AESA antennas provide high-gain transmission to all locations on a timeshared basis. Some embodiments include an INS. In some such embodiments the INS includes an extended Kalman Filter (KF). The combination of signals with the KF enables the timesharing of signals from the scanning AESAs. Long integration times within the receiver user equipment (UE) are used to overcome the power limitations imposed by the large cislunar distances.

Some embodiments include a control station utilizing Two-Way Time Transfer (TWTT) for synchronization of the cislunar PNT network and sending and receiving of data to the deployed mission users. This provides enhanced security to eliminate spoofing, as well as denial of access to unauthorized entities. SVs and users perform TWTT to acquire time and range, and to authenticate each other. The system allows or denies access based upon the system access criteria. In some embodiments, the system assigns user-specific cryptographic keys. In some such embodiments, connection to one satellite provides time and connection to three satellites provides position. In some embodiments, the system tracks position of all users.

In some embodiments, the system utilizes scanning active electronically steerable antenna (AESA) technology, combined with INS integration to span the large distances of cislunar space while reducing SWaP-C of satellites and user equipment. Some such embodiments include bidirectional links using two-way time transfer to reduce the number of satellites needed for time and position fix. The bidirectional links enable significantly improved authentication and cryptographic security compared to legacy PNT systems. The bidirectional links also enable the system to know the location of all users, and to allow or deny access to the any user. The narrow AESA beamwidths provide inherent resilience to jamming and spoofing. Other advantages include power control and capability to only allow access to paid subscribers (commercial version), and other improvements apparent to one skilled in the art.

In some embodiments, AESA antennas scan high-gain, narrow beams over the cislunar volume. In some such embodiments, the AESA produces a 6-degree beam, and it can scan 78 such beams to cover a 60-degree cone. Each scan location receives a signal with a gain of 25 dB. The duty-cycle is 1.3% per beam and the update period is 78 seconds. In another such embodiments, the AESA produces a 3-degree beam, and it can scan 312 such beams to cover a 60-degree cone. Each scan location receives a signal with a gain of 32 dB. The duty-cycle is 0.3% per beam and the update period is 5.5 minutes. In both of the previous embodiments, a 1 second dwell time is assumed. In some embodiments, a lower dwell time (and therefore lower integration time) is used to reduce the update period.

In some embodiments, the bidirectional link will contain an acquisition preamble that is used by the PNT SV to determine how disadvantaged each user may be. In cases where users have a very low signal-to-noise ratio (SNR), the SV is capable of allocating extra dwell time to allow aid detection. Conversely, users closer to the system's SVs will have a higher SNR, and do not need as long a dwell time. In this way, the system is able to allocate resources as needed.

Figure 2:
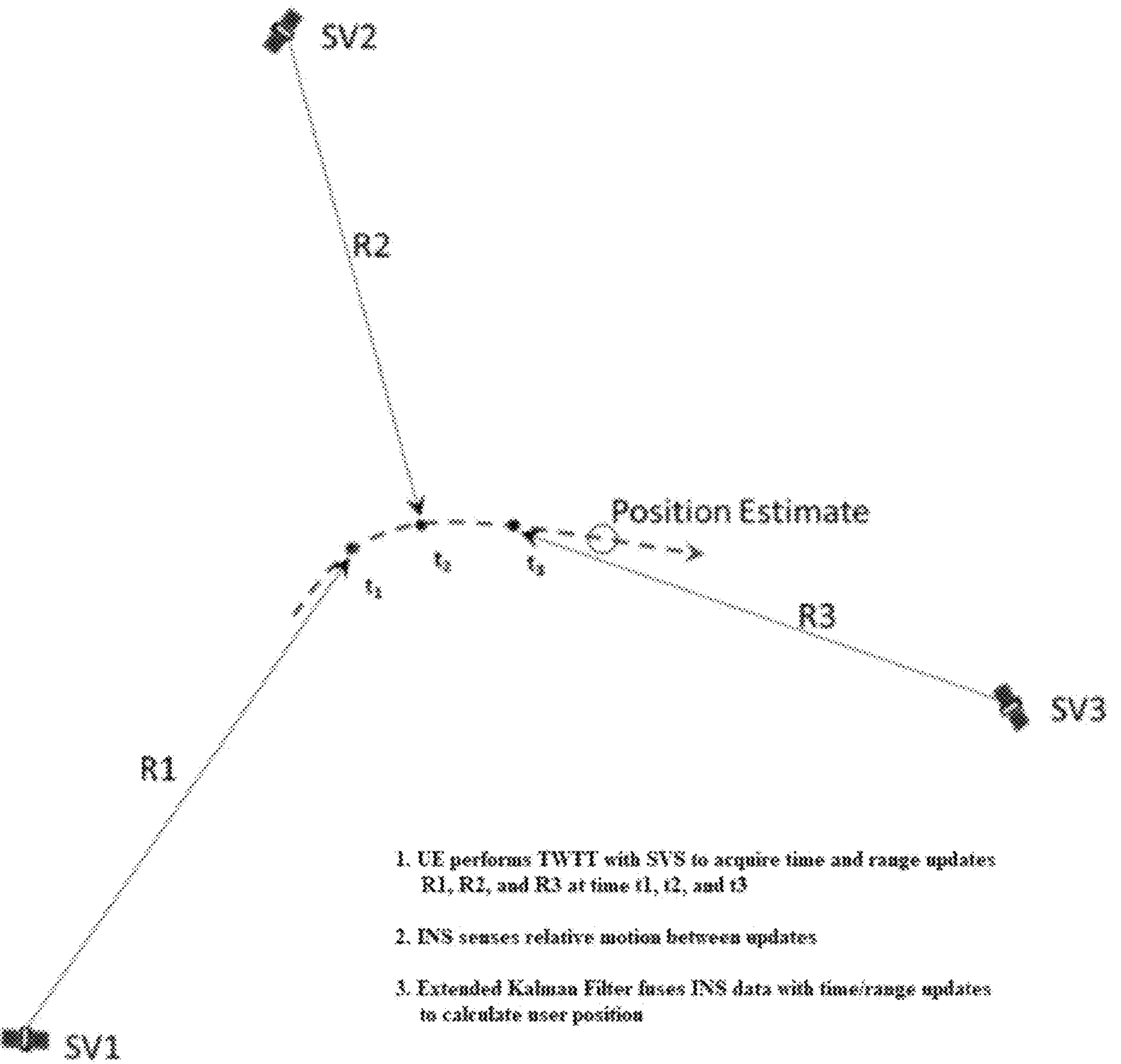
FIG. 2 shows a method of determining position according to some embodiments of the present invention.

In some embodiments, each location need only receive and transmit for a fraction of the time. In some embodiments, the range measurement to each SV will be discrete and sequential, not simultaneous. FIG. 2 illustrates the range measurement over a trajectory interval according to some embodiments. In the embodiment of FIG. 2, an INS is integrated into the system's SVs and UE to sense platform motion. An extended Kalman filter algorithm uses the INS to compensate for the discrete sequential range measurements and provide a PNT solution. The INS and KF also compensate for the high relative speeds between SV PNT sources and users. As seen in FIG. 2, the UE performs TWTT with the SVs to acquire time and range updates R1, R2, and R3 at times t1, t2, and t3. Then the INS senses relative motion between the updates. Finally, the extended Kalman filter fuses INS data with time/range updates to calculate user position.

In some embodiments, the SVs include time division multiplexing (TDM) Scanning AESAs. In some such embodiments, the SVs use AESAs to scan a high-gain pencil beam over the coverage volume. Thus, providing high gain needed to close PNT links at large distances while covering the vast cislunar volume. In some embodiments, a low duty-cycle TDM approach is used to enable AESA to scan beam over large cislunar volume.

In some embodiments, the satellites perform TWTT updates with master reference (AFS) clock at a ground station. Satellites use stable oven-controlled crystal oscillator (OCXO) or chip scale atomic clocks (CSAC) which are adequate to keep accurate time between updates, thus eliminating need for spaceborne atomic clocks in addition to cost and risk reduction. In some embodiments, other prevision oscillators are used. In various embodiments, TCXO, VCXO, XO, and/or VCTXO oscillators are used. It will be appreciated that similar such oscillators, whether now existing or in the future developed, are usable in various embodiment of the present invention. In some embodiments, the oscillator is not as stable as the master clock, but is calibrated by the master clock via TWTT.

In some embodiments, the Tx and Rx bands are adjacent to NASA's X-band LunaNet Allocation. This allows for interoperability of antennas and other elements between the present system and LunaNet.

In some embodiments, the system includes optical intersatellite links (ISLs) between the SVs. In some such embodiments, laser ISLs are used to provide time and ephemeris updates to the SVs.

In some embodiments, SVs are included in GEO, all five LaGrange points, and lunar orbit. Inclusion of a PNT transmitter at L3 increases overall service volume as well as enabling terrestrial and Earth-orbit use. In some embodiment, SVs are only needed and included at L1, L2, L4, and L5. Such an embodiment is shown in FIG. 3.

Figure 3:
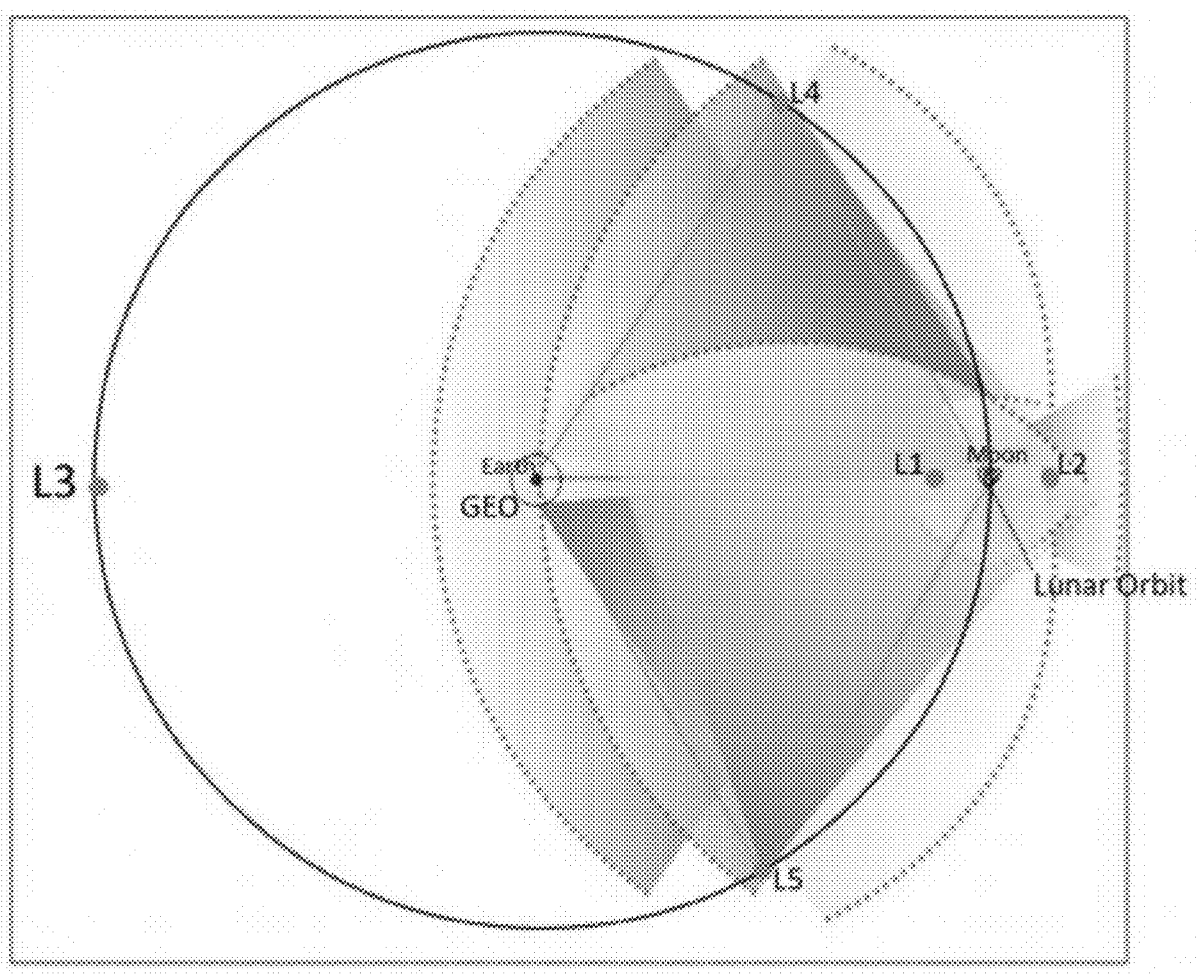
FIG. 3 shows a model illustrating conical volumes of SV coverage according to some embodiments of the present invention.

As shown in FIG. 3, the SVs point their antennas to cover the cislunar area as shown. The two GEO satellites closest to the moon will point their antennas in the direction of the midpoints between the Moon and L4, and Moon and L5, respectively. They each scan arcs which are roughly 60 degrees. The L4 and L5 SVs will point at each other, they each scan arcs of 60 degrees. The LI and L2 satellites point their antennas at the earth. This forms the arcs shown in FIG. 3 covering the cislunar region. The distance between the Earth and L2 is a maximum of 460,000 km. Each of the arcs cover this distance so that each location in cislunar space is within range of at least 3 SVs.

As shown in FIG. 3, in some embodiments a PNT system is formed is by the placement of the satellites and conical beams such that users in the operational volume are visible to at least 3 satellites—i.e. the operational volume is the intersection of 3 or more conical coverage volumes.

Figure 4:
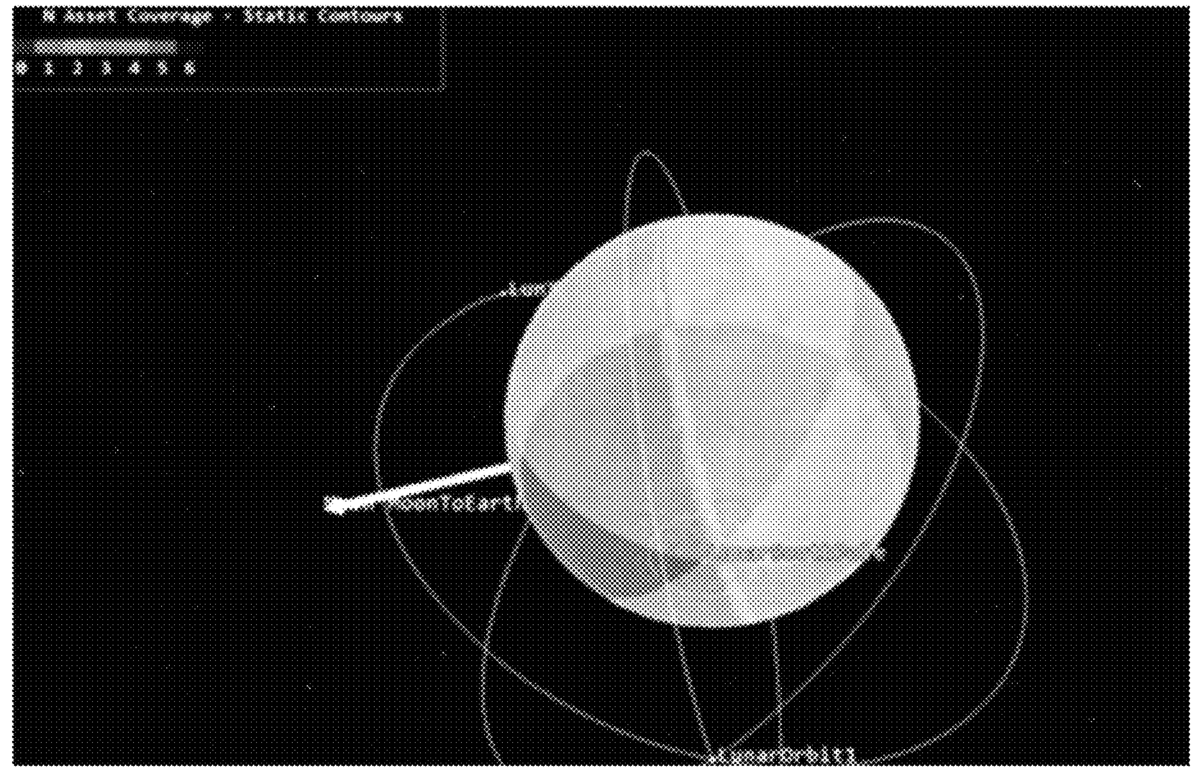
FIG. 4 shows a model of an additional satellite constellation for enhanced lunar pole coverage, according to some embodiments of the present invention.

In some embodiments, at least one additional satellite constellation is included to provide enhanced coverage of the lunar poles. In some such embodiments, the additional constellation operates in the same band using the same TWTT protocols and waveforms as the other SVs and UE. An example 3-plane Lunar constellation is shown in FIG. 4. When a UE unit is closer to the lunar surface (e.g., landing at lunar south pole) three or more SV PNT sources from the lunar orbits and/or LI and L2 locations are thus available at a considerably closer distance, typically less than 24,000 km. This allows for faster acquisition and more frequent PNT updates needed for critical maneuvers at higher velocity.

In some embodiments, the SVs have 30 watts of RF power, at 7 GHz. In some embodiments, the SV transmit antenna is a 40 cm diameter AESA that provides a 25 dB gain beam with a (two-sided) beamwidth of 6 degrees. The required DC power for the SV transmitter is 120 W. In some embodiments, the receive antenna is a 15 cm diameter AESA, with a beamwidth of 16 degrees. The resulting C/No is 35 dB, which is sufficient to acquire and track a downlink ranging signal with margin to spare. In some embodiments, the parameters in the following table are used:

| | | | |
|---|---|---|---|
| SV | Frequency (Hz) | 7.00E+09 | Hz |
| | HPA Power | 14.5 | dBW |
| | SVHPA efficiency | 25.00% | |
| | Pulse Transmit Duty Cycle | 100.00% | |
| | SVDC Consumption | 120 | W |
| | Cable Loss | 1 | dB |
| | Filter Loss | 0.5 | dB |
| | Truncation Loss | 0.3 | dB |
| | RF Power Ant. Input | 13 | dB W |
| | Antenna Gain (EOC) | 25.5 | dB |
| | SV Design Margin | 1 | dB |
| | EIRP | 37.4 | dB W |
| Path Loss | Range (km) | 460400 | Km |
| | Path Loss (FS) | 222.6 | dB |
| Receiver | RIP | −185.2 | dB W |
| | Antenna Gain (Rx) | 17 | dB |
| | Pol Loss | 0.5 | dB |
| | Signal Power (RSS) | −168.7 | dB W |
| Receiver, kT | Boltzmanns Constant | −228.6 | dBW/k/HZ |
| | System Noise Temp (290 K) | 24.6 | dB K |
| | C/No (dB) | 35.3 | dB |

| | | | |
|---|---|---|---|
| SV | Frequency (Hz) | 7.00E+09 | Hz |
| | HPA Power | 7 | dBW |
| | SVHPA efficiency | 25.00% | |
| | Pulse Transmit Duty Cycle | 1.30% | |
| | SVDC Consumption | 0.3 | W |
| | Cable Loss | 1 | dB |
| | Filter Loss | 0.5 | dB |
| | Truncation Loss | 0.3 | dB |
| | RF Power Ant. Input | 5.2 | dB W |
| | Antenna Gain (EOC) | 17 | dB |
| | SV Design Margin | 1 | dB |
| | EIRP | 21.2 | dB W |
| Path Loss | Range (km) | 460400 | Km |
| | Path Loss (FS) | 222.6 | dB |
| Receiver | RIP | −201.4 | dB W |
| | Antenna Gain (Rx) | 25 | dB |
| | Pol Loss | 0.5 | dB |
| | Signal Power (RSS) | −176.9 | dB W |
| Receiver, kT | Boltzmanns Constant | −228.6 | dBW/k/HZ |
| | System Noise Temp (290 K) | 24.6 | dB K |
| | C/No (dB) | 27.1 | dB |

In some embodiments, the uplink and downlink use the same sized antennas. In some embodiments, the uplink is able to close with only 5 W of RF power from the user equipment. Because the duty cycle is so low, the uplink transmitter only consumes an average of 0.3 W. The resulting C/No is 27 dB-Hz, which is sufficient for receiver operation. This result indicates that a bi-directional link is practical. The 15 cm antenna diameter and low power consumption are suitable for spacecraft, lunar landers, or roving vehicles. The link budgets above demonstrate that by using scanning AESA's, together with integrated INS sensors and extended KF, it is possible to provide PNT over the cislunar space with modest size antennas and keep DC consumption within practical levels for small satellite platforms.

In some embodiments. the SV utilizes two 40 cm AESA's, one for transmit and one for receive. In some embodiments. the transmit AESAs have a high-power amplifier (HPA) consumption of 120 W. In some embodiments, the UE antenna size is 15 cm (6 inches), and with DC power for transmit less than 0.5 W. In some embodiments, the transmit and receive AESA's are integrated into the same unit. In some embodiments, they are separate functional units. In some embodiments, the SWaP-C of the UE is consistent with vehicle mounted units for spacecraft, landers, roving vehicles or for small portable units which can be deployed as needed.

In some embodiments, a GPS Anti-Jam Mitigation Engine (GAME) is included.

In some embodiments, the uplink and downlink signal structure supports time, ephemeris, cryptography, and other required messages.

Some embodiments include a satellite comprising a transmitter and an AESA antenna. In some such embodiments, the transmitter transmits PNT signal transmissions at each update period—a fixed interval of time. In some such embodiments, the AESA antenna scans a narrow high-gain beam over a volume of interest at each update period. In some such embodiment, the satellite comprises an inertial navigation system that provides PNT in between each update period by utilizing an extended Kalman filter. In some such embodiments, the satellite bidirectionally links with a receiver unit using two-way time transfer.

Some embodiments include a PNT receiver unit comprising a receiver and an AESA antenna. In some such embodiments, the receiver communicates with a satellite and collects PNT signal transmissions at each occurrence of an update period—a fixed interval of time. In some such embodiments, the AESA antenna scans a narrow high-gain beam over a volume of interest at each update period. In some such embodiment, the receiver unit comprises an inertial navigation system that provides PNT in between each update period by utilizing an extended Kalman filter. In some such embodiments. the receiver unit bidirectionally links with a satellite using two-way time transfer.

In some embodiments including a bidirectional link between an SV and a receiver, the bidirectional link is configured to use PN codes with correlations for pseudo-range calculations. Some embodiments include a unidirectional link from one or more SVs to a receiver. In some such embodiments, the unidirectional link is configured to use PN codes with correlations for pseudo-range calculations. Some embodiments include a unidirectional link from one or more SVs to a receiver.

Some embodiments include a method for determining PNT. Some such embodiments are described in FIG. 2. In some such embodiments, these steps include performing a first update by bidirectionally linking to a first satellite using two-way time transfer to acquire a time and range update at a first location. Then performing a second update, a fixed amount of time after said first update, by bidirectionally linking to a second satellite using two-way time transfer to acquire a time and range update at a second location. Then performing a third update, a fixed amount of time after said second update, by bidirectionally linking to a third satellite using two-way time transfer to acquire a time and range update at a third location. Then determining the INS data using an inertial navigation system. In some embodiments, the INS data includes the relative motion between of said receiving unit between updates. In some embodiments, the INS data includes additional time and positioning information. Then, in some embodiments, the system determines the PNT of the receiving unit and/or user by utilizing an extended Kalman filter, said INS data, and the information from the updates. The method according to claim 18, wherein each satellite includes an AESA antenna configured to scan a narrow high-gain beam over a volume of interest at each update. In some embodiments, the method further includes the step of using PN codes with correlations to make pseudo-range calculations. In some such embodiments, this calculation is made at the receiver.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although some embodiments above have been described above, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention.

Having thus described the invention, what is claimed as new and desired to be secured by Letters Patent is:

1. A position, navigation, and/or time (PNT) system comprising:

at least one satellite configured to transmit PNT signal transmissions at a fixed interval;

at least one receiver unit bidirectionally linked to the at least one satellite via a bidirectional link;

a satellite active electronically steerable antenna (AESA) coupled to each satellite of the at least one satellite and a receiver AESA coupled to each receiver unit of the at least one receiver unit, wherein the satellite AESA is configured to scan a beam over a volume of interest and the receiver AESA is configured to scan to acquire the beam;

wherein the bidirectional link is configured to use two-way time transfer to acquire time and range updates, and wherein the at least one receiver unit is configured to receive and transmit for the two-way time transfer during a dwell time of the scanned beam that is less than the fixed interval; and an inertial navigation system coupled to the at least one receiver unit configured to provide PNT between successive time and range updates by using an extended Kalman filter to fuse inertial navigation system data with the time and range updates.

2. The PNT system of claim 1, wherein the satellite AESA is configured to scan a narrow beam over the volume of interest.

3. The PNT system of claim 1, wherein each receiver unit is bidirectionally linked to each satellite using two-way time transfer.

4. The PNT system of claim 3, wherein each satellite is further configured to transmit pseudo-noise (PN) codes with correlations for pseudo-range calculations.

5. The PNT system of claim 1, wherein the at least one satellite includes a unidirectional link to the at least one receiver unit, wherein said unidirectional link is configured to use pseudo-noise (PN} codes with correlations for pseudo-range calculations at the at least one receiver unit.

6. The PNT system of claim 1, further comprising a control station including a master reference clock.

7. The PNT system of claim 6, wherein each satellite performs periodic time updates by utilizing two-way time transfer with said master reference clock.

8. The PNT system of claim 1, wherein each satellite further includes an oscillator calibrated by a master reference clock using two-way time transfer.

9. The PNT system of claim 1, wherein the satellite AESA and the receiver AESA utilize a time division multiplexing scheme when scanning.

10. The PNT system of claim 1, wherein the at least one satellite comprises a plurality of satellites that are in communication with each other by an optical inter-satellite link.

11. A position, navigation, and/or time (PNT} system comprising:

a plurality of satellites;

a plurality of receiver units;

a bidirectional link between each receiver unit of the plurality of receiver units and at least one satellite of the plurality of satellites, wherein each bidirectional link is configured to use two-way time transfer, a satellite active electronically steerable antenna (AESA) coupled to each satellite of the plurality of satellites and a receiver AESA coupled to each receiver unit of the plurality of receiver units, wherein each satellite AESA is configured to scan a beam over a volume of interest during an update period, wherein each update period occurs after a fixed interval of time, and wherein each receiver unit is configured to receive and transmit for the two-way time transfer during a dwell time of the scanned beam that is less than the fixed interval; and an inertial navigation system coupled to each receiver unit of the plurality of receiver units, wherein at each update period, a receiver unit of the plurality of receiver units is configured to establish the bidirectional link to at least one satellite of the plurality of satellites to determine PNT; and wherein the inertial navigation system is configured to provide PNT between successive update periods by utilizing an extended Kalman filter to fuse inertial navigation system data with time and range updates obtained via the two-way time transfer.

12. The PNT system of claim 11, wherein each bidirectional link is configured to use pseudo-noise (PN) codes with correlations for pseudo-range calculations.

13. The PNT system of claim 11, further including a unidirectional link between at least one satellite of the plurality of satellites and at least one receiver unit of the plurality of receiver units.

14. The PNT system of claim 13, wherein each unidirectional link is configured to use pseudo-noise (PN) codes with correlations for pseudo-range calculations at the at least one receiver unit.

15. The PNT system of claim 11, further comprising a control station including a master reference clock.

16. The PNT system of claim 11, wherein an intersection of the scanned beams from three satellites of the plurality of satellites creates an operational volume.

17. The PNT system of claim 16, wherein the operational volume is configured such that a user in the operational volume is visible to at least three satellites.

18. A method for determining position, navigation, and/or time (PNT) using a receiving unit, the method comprising the steps of:

performing a first update by bidirectionally linking the receiving unit to a first satellite using two-way time transfer between the receiving unit and the first satellite to acquire a time and range update at a first location of the receiving unit;

performing a second update, a fixed amount of time after the first update, by bidirectionally linking the receiving unit to a second satellite using the two-way time transfer between the receiving unit and the second satellite to acquire a time and range update at a second location of the receiving unit;

performing a third update, the fixed amount of time after the second update, by bidirectionally linking the receiving unit to a third satellite using the two-way time transfer between the receiving unit and the third satellite to acquire a time and range update at a third location of the receiving unit;

determining inertial navigation system (INS) data, using an inertial navigation system, the INS data including the relative motion of the receiving unit between the first, second, and third time and range updates; and determining the PNT of the receiving unit utilizing an extended Kalman filter, the INS data, and the first, second, and third time and range updates, wherein the first, second, and third updates are discrete and sequential, not simultaneous, and the receiving unit receives and transmits for the two-way time transfer only during respective dwell times of beams scanned over a volume of interest by active electronically steerable antennas (AESAs) of the receiving unit and the respective satellites, wherein the respective dwell times are less than the fixed amount of time.

19. The method according to claim 18, wherein each respective satellite includes a satellite AESA configured to scan a narrow beam over the volume of interest at each respective update.

20. The method according to claim 18, further including the step of using pseudo-noise (PN) codes with correlations to make pseudo-range calculations.

* * * * *